United States Patent [19]

Burgermeister et al.

[11] 4,261,165
[45] Apr. 14, 1981

[54] BEARING ARRANGEMENT FOR MOUNTING A ROTOR OF AN OPEN-END SPINNING MACHINE

[75] Inventors: Ulrich Burgermeister; Gerhard Mandl; Viktor Pietrini, all of Winterthur, Switzerland

[73] Assignee: Rieter Machine Works, Ltd., Winterthur, Switzerland

[21] Appl. No.: 14,559

[22] Filed: Feb. 23, 1979

Related U.S. Application Data

[63] Continuation of Ser. No. 818,195, Jul. 22, 1977, abandoned.

[30] Foreign Application Priority Data

Sep. 9, 1976 [CH] Switzerland .................. 11434/76

[51] Int. Cl.³ .............................................. D01H 7/00
[52] U.S. Cl. ................................... 57/58.89; 308/77
[58] Field of Search .......... 308/77, 1 A, 178, DIG. 4, 308/DIG. 14, DIG. 15; 57/58.89, 104, 130; 165/185, DIG. 7; 74/606 A

[56] References Cited

U.S. PATENT DOCUMENTS

| | | | |
|---|---|---|---|
| 2,833,601 | 5/1958 | Guinard | 308/77 |
| 2,897,252 | 7/1959 | Martin | 165/185 |
| 2,961,847 | 11/1960 | Whitney et al. | 308/77 |
| 3,097,895 | 7/1963 | Matt | 308/77 |
| 3,128,756 | 4/1964 | Galvin | 165/185 |
| 3,548,158 | 12/1970 | McCaskill | 165/185 |
| 3,911,659 | 10/1975 | Mandl | 57/58.89 |
| 3,934,396 | 1/1976 | Stahlecker et al. | 57/58.89 |

FOREIGN PATENT DOCUMENTS

970435  9/1964  United Kingdom .................. 308/77

*Primary Examiner*—Lenard A. Footland
*Attorney, Agent, or Firm*—Kenyon & Kenyon

[57] ABSTRACT

The shaft on which the rotor is secured is mounted via anti-friction bearings in a sleeve which, in turn, is spaced from the housing by spacer means of low heat conductivity. In addition, at least one heat-conducting means of high heat conductivity connects the sleeve to the housing in heat conductive relation. The heat generated during rotation of the rotor shaft is dissipated through the heat conducting means to allow increased rotational speeds, for example, up to 55,000 rpm.

10 Claims, 10 Drawing Figures

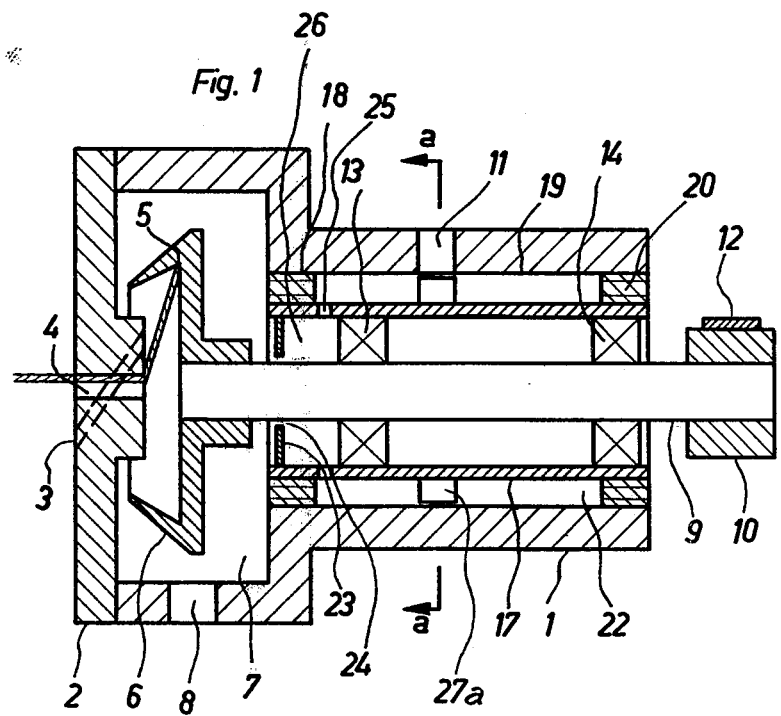
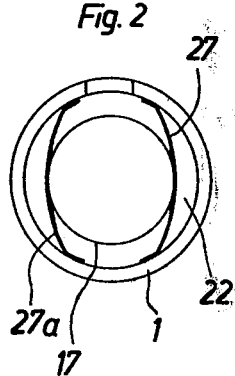
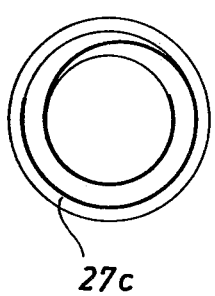

BEARING ARRANGEMENT FOR MOUNTING A ROTOR OF AN OPEN-END SPINNING MACHINE

This is a continuation of application Ser. No. 818,195 filed July 22, 1977, abondoned.

This invention relates to a bearing arrangement for mounting a rotor of an open-end spinning machine.

As is known, various types of bearing arrangements have been used to mount the shaft of a spinning rotor of an open-end spinning machine within a housing. In some cases, such as described in German Patent Application DT AS No. 2,333,555, the shaft has been rotatably mounted in anti-friction bearings which are contained in a sleeve which, in turn, is mounted within a stationary housing via an elastic support member. These elastic support members have an advantage in that higher rotor speeds can be achieved and a longer bearing life can be obtained. However, an increase in rotational speed necessarily causes an increase in the bearing temperatures and in the amount of heat generated. Since the elastic support members are generally made of elastomers of low heat conductivity, the members cannot withstand the heat nor can the heat be dissipated in a suitable manner. In this case, the air stream which usually flows along the bearing housing and which is generated by a pressure differential between the rotor space in which a vacuum pressure prevails and the bearing housing connected with atmospheric pressure, is insufficient for cooling the bearings. As a result, a limit is imposed on the speed of the rotor.

In addition, not only do the high temperatures shorten the life of the anti-friction bearings, but also, the high temperatures shorten the life of the elastic support members of the bearing arrangement.

Accordingly, it is an object of the invention to provide an efficient way of cooling the bearing arrangement for a rotor shaft of an open end spinning machine.

It is another object of the invention to provide a bearing arrangement of maximum efficiency and of the lowest possible expense.

It is another object of the invention to provide a bearing arrangement for mounting a rotor of an open end spinning machine which permits relatively high rotor rotational speeds.

Briefly, the invention provides a bearing arrangement for mounting a rotor of an open end spinning machine in a housing wherein the bearing arrangement comprises a sleeve, at least a pair of anti-friction bearings mounted in the sleeve, a spacer means made of a material of low heat conductivity for spacing the sleeve from and within the housing and at least one heat conducting means of high heat conductivity for connecting the sleeve to the housing in heat conductive relation.

The heat conducting means is such so as to provide a heat conducting path between the sleeve and the housing so as to dissipate the heat which is generated during rotation of a rotor shaft within the bearings.

The heat conducting means may be in one of a number of forms. For example, in one embodiment, one or more metal strips are used as the heat condducting means. In another embodiment, a spiral metal strip is used which surrounds the sleeve and entirely contacts the housing. In still another embodiment, a plurality of U-shaped metal strips are distributed circumferentially about the sleeve and are clamped between the sleeve and the housing.

In still other embodiments, the heat conducting means may be of corrugated metal strip, a mass of metal wool or a mass of knitted metal fabric. Still further, the heat conducting means may be in the form of a liquid, such as oil.

In each of the various embodiments, the heat conducting means has a heat conductivity of more than 0.25 calories per centimeter-second grade.

These and other objects and advantages of the invention will become more apparent from the following detailed description and appended claims taken in conjuction with the accompanying drawings in which:

FIG. 1 illustrates a longitudinal cross-sectional view of a rotor bearing arrangement in accordance with the invention;

FIG. 2 illustrates a view taken on line A—A of FIG. 1;

FIG. 3 illustrates a view similar to FIG. 2 of a modified heat conducting means in accordance with the invention;

FIG. 4 illustrates a further modified heat conducting means of spiral form in accordance with the invention;

Figure 5:
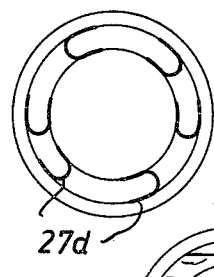
FIG. 5 illustrates a further modified heat conducting means formed of a plurality of U-shaped metal strips in accordance with the invention.

Referring to FIG. 1, the open end spinning machine has a housing 1 which is of generally T-shaped cross-section and which is provided with a cover 2 at one end. This cover 2 contains a fiber input duct 3 and a central yarn takeoff tube 4 of known construction. In addition, the cover 2 projects into the housing at a central point so as to be disposed within the profile of a rotor 6. As shown, the rotor 6 has a fiber collecting surface 5 which receives individual fibers which are loosely supplied via the fiber input duct 3 at at the largest inside diameter of the rotor 6 along with an air stream. These fibers are spun into yarn which is removed via the takeoff tube 4. The housing forms a rotor space 7 about the rotor 6 and communicates via a duct 8 with a vacuum source so that a pressure differential required for generating the air stream can be generated by conducting the rotor space 7 with a vacuum source via the duct 8.

The housing 1 also has an air inlet opening 11 for purposes as described below.

As shown, the rotor 6 is mounted in a cantilever manner on a shaft 9 which is driven at the opposite end via a drive whorl 10 and drive belt 12 as is known.

A bearing arrangement is provided for rotatably mounting the shaft 9 within the housing 1. To this end, the bearing arrangement includes a pair of anti-friction bearings 13, 14 which are located between the rotor 6 and the drive whorl 10. In addition, the two bearings are tightly fitted into a thin walled rigid sleeve 17 which, in turn, is axially supported by a spacer means constituted by a pair of elastic rings 18, 20 ithin a bore 19 of the housing 1. As shown, the elastic ring 18 is positioned outside of the bearing 13 facing the rotor 6 while the second elastic ring 20 is provided in the zone of the anti-friction bearing 14. The elastic ring 18 also serves to prevent penetration of air into the rotor space 7 in which a subatmospheric pressure or a vacuum is maintained from an annular chamber 2 formed between the sleeve 17 and housing 1.

It is to be noted that an uncontrolled penetration of air into the rotor space 7 from the exterior of the housing 1 via the opening or duct 11 which is in communication with the annular chamber 22 would imperil the maintenance of a controlled subatmospheric pressure therein. Thus, a hollow labyrinth sealing ring 23 is set in the sleeve 17 axially outside of the anti-friction bearing 13 facing the rotor 6. The face side or inner periphery of the ring 23 together with the shaft 9, forms a narrow ring shaped gap 24. The space between the labyrinth sealing ring 23, the sleeve 17 and the rotor 9 forms a pressure equalizing chamber 26 which is connected via radial air penetration openings 25 with the annular chamber 22.

As shown in FIGS. 1 and 2, a removably mounted heat conducting means of high heat conductivity is disposed in the annular chamber 22 between the sleeve 17 and the bore 19 of the housing 21. The heat conducting means is in the form of two thin elastic i.e. resilient metal strips 27a made of a material of better heat conductivity than the elastic rings 18, 20. That is, the strips 27a are made of a material with a heat conductivity of more than 0.25 calories/centimeter-second grade. These strips 27 are inserted in tight contact with the sleeve 17 and the bore 19 of the housing 1 as indicated in FIG. 2.

During use, the metal strips 27a drain the heat generated by the anti-friction bearings 13, 14 and transmit the heat from the sleeve 17 to the housing 1.

Referring to FIGS. 3 to 8, the heat conducting means may be made of alternative shapes and constructions in order to establish a direct heat conductive connection between the sleeve 17 and the housing and to increase the surface area exposed to the passage of air through the annular chamber 22. As shown in FIG. 3, the heat conductive means may be in the form of a U-shaped metal strip 27b or, as shown in FIG. 4, the heat conductive means may be in the form of a spiral strip 27c which surrounds the sleeve 17 and tightly contracts the housing 1. As shown in FIG. 5, the heat conductive means may be in the form of a plurality of U-shaped metal strips which are distributed circumferentially about the sleeve 17 and are clamped between the sleeve 17 and the housing 1.

Figure 6:
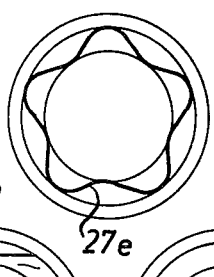
FIG. 6 illustrates a heat conducting means of corrugated form in accordance with the invention.
Figure 7:
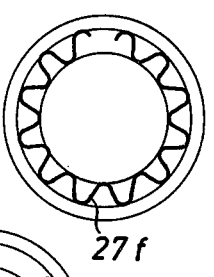
FIG. 7 illustrates a further corrugated form of heat conducting means in accordance with the invention.

Referring to FIG. 6, the heat conductive means may be in the form of a corrugated metal strip 27e or as shown in FIG. 7 of a modified corrugated strip 37f.

Figure 8:
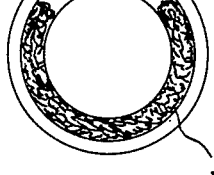
FIG. 8 illustrates a view of a heat conducting means formed of a mass of metal wool in accordance with the invention.

Referring to FIG. 8, the heat conductive means may be in the form of metal wool 31 or in the form of a mass of knitted metal fabric (not shown). In this case, the mass of metal wool or metal fabric is placed in the annular chamber 22 to establish a connection between the sleeve 17 and the housing 1 and to increase the surface area contacted by the air passing through the chamber 22.

Referring to FIGS. 2 to 7, the various strips 27a–27f increase the surface area contacted by the air passing through the annular chamber 22 to the rotor space 7 and thus increase the cooling effect considerably.

Figure 10:
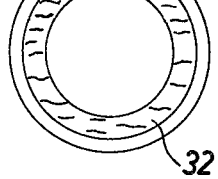
FIG. 10 illustrates a view taken on line b—b of FIG. 9.
Figure 9:
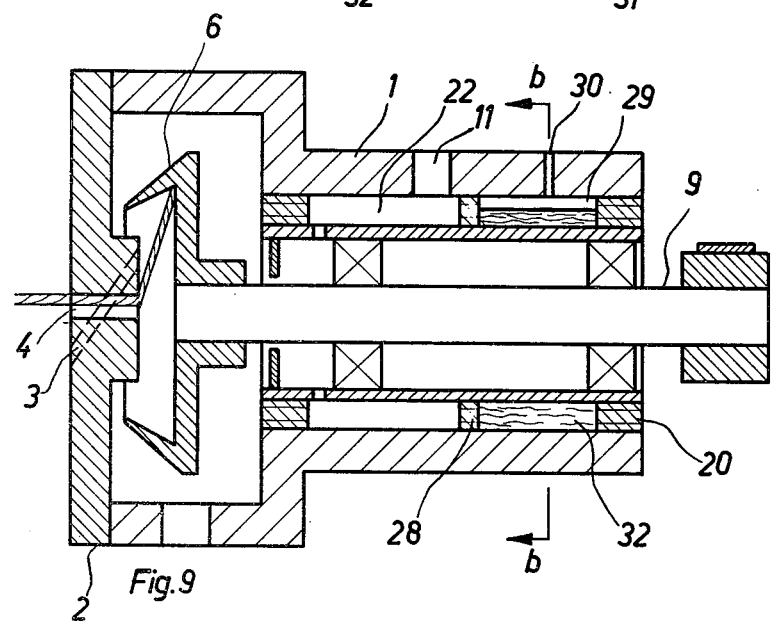
FIG. 9 illustrates a longitudinal cross-sectional view of a further modified rotor bearing arrangement utilizing a liquid heat conducting means in accordance with the invention.

Referring to FIGS. 9 and 10, wherein like reference characters indicate like parts as above, the annular chamber 22 is partially filled with a heat conducting liquid 32. For this purpose, the chamber 22 is divided by an additional elastic ring 28 into two separate sub-chambers 22, 29. In addition, a sealable opening 30 is provided in the housing so as to permit filling of the sub-chamber 29 with the heat conductive liquid, e.g. oil. Alternatively, the whole chamber 22 can be filled in its axial and/or radial extent with liquid, if the supply of air to the pressure equalizing chamber 26 is effected otherwise and not via the annular chamber 22.

The invention thus provides a heat conducting means which is simple and economical to manufacture and use for dissipating heat generated within an open end spinning machine. In addition, the heat conducting means can be mounted in existing rotor bearing arrangements in a relatively simple manner. Further, the heat conductive means may be used in rotor bearing arrangements which have more than two bearings supports for a rotor shaft.

A further advantage of the invention resides in that no energy, for example in the form of an additional cooling air stream is required for effective cooling action. Further, the bearing arrangement allows higher rotational speeds of the rotor of about 55,000 rpm and above without impairment of the life of the bearings and of the elastic rings of the spacer means.

What is claimed is:

1. The combination of
   a housing having a space therein;
   a shaft having a fiber spinning rotor located within said space and a drive whorl outside said housing;
   an opening in said housing enabling communication of said space with a sub-atmospheric pressure producing means in use so that said space can be held at a controlled sub-atmospheric pressure in use;
   a sleeve disposed within said housing in spaced relation to said housing to define an annular chamber therewith and in spaced relation to said shaft;
   anti-friction bearings mounted in said sleeve and rotatably supporting said shaft therein;
   spacer means in said annular chamber between said sleeve and said housing, said spacer means comprising a first spacer encircling said sleeve and isolating said space from said chamber and a second spacer displaced longitudinally of said shaft from the first spacer, both said first and second spacers being made of an elastomeric material of low heat conductivity;
   at least one air inlet opening in communication with said annular chamber providing access of air to said chamber from outside said housing and at least one opening in said sleeve so that in use a controlled flow of air is drawn through said anular chamber and said space by said sub-atmospheric pressure producing means; and
   at least one removably mounted thin resilient strip of material of high heat conductivity disposed in said annular chamber so as to be subjected to said flow of air in use, said strip being separate from said sleeve and said housing to bridge the gap therebetween with at least one major face of said strip engaging said sleeve and at least one major face of said strip engaging said housing and being held in tight heat conducting contact therewith.

2. The combination as set forth in claim 1 wherein said strip is a corrugated metal strip.

3. The combination as set forth in claim 1 wherein said strip has a heat-conductivity of more than 0.25 calories per centimeter-second centigrade.

4. The combination of
a housing;
a shaft having a fiber spinning rotor at one end within said housing and a drive whorl at an opposite end;
a sleeve disposed within said housing in spaced relation to said housing to define an annular chamber therewith and in spaced relation to said shaft;
at least a pair of anti-friction bearings mounted in said sleeve and rotatably supporting said shaft therein;
a spacer means in said annular chamber between said sleeve and said housing, said spacer means being made of a material of low heat conductivity;
at least one air inlet opening in said housing in communication with said annular chamber for the passage of air through said annular chamber; and
at least one removably mounted heat-conducting thin resilient strip of material of high heat conductivity resiliently mounted between said sleeve and said housing in said annular chamber in tight contact with said sleeve and said housing to connect said sleeve with said housing in heat-conductive relation, said strip having one major face engaging said sleeve and another major face engaging said housing and providing an increased surface area exposed to the passage of air through said annular chamber.

5. The combination of
a housing;
a shaft having a fiber spinning rotor at one end within said housing and a drive whorl at an opposite end;
a sleeve disposed within said housing in spaced relation to said housing to define an annular chamber therewith and in spaced relation to said shaft;
at least a pair of anti-friction bearings mounted in said sleeve and rotatably supporting said shaft therein;
a spacer means in said annular chamber between said sleeve and said housing, said spacer means being made of a material of low heat conductivity;
at least one air inlet opening in said housing in communication with said annular chamber for the passage of air through said annular chamber; and
at least one removably mounted heat-conducting thin resilient strip of material of high heat conductivity resiliently mounted between said sleeve and said housing in said annular chamber in tight contact with said sleeve and said housing to connect said sleeve with said housing in heat-conductive relation, said strip being bent so that the same major face engages both said sleeve and said housing and providing an increased surface area exposed to the passage of air through said annular chamber.

6. The combination of
a housing;
a shaft having a fiber spinning rotor at one end within said housing and a drive whorl at an opposite end;
a sleeve disposed within said housing in spaced relation to said housing to define an annular chamber therewith and in spaced relation to said shaft;
at least a pair of anti-friction bearings mounted in said sleeve and rotatably supporting said shaft therein;
a spacer means in said annular chamber between said sleeve and said housing, said spacer means being made of a material of low heat conductivity;
at least one air inlet opening in said housing in communication with said annular chamber for the passage of air through said annular chamber; and
at least one removably mounted heat-conducting thin resilient strip of material of high heat conductivity resiliently mounted between said sleeve and said housing in said annular chamber in tight contact with said sleeve and said housing to connect said sleeve with said housing in heat-conductive relation, said strip providing an increased surface area exposed to the passage of air through said annular chamber and having a width substantially less than the axial length of said chamber.

7. The combination of
a housing;
a shaft having a fiber spinning rotor at one end within said housing and a drive whorl at an opposite end;
a sleeve disposed within said housing in spaced relation to said housing to define an annular chamber therewith and in spaced relation to said shaft;
at least a pair of anti-friction bearings mounted in said sleeve and rotatably supporting said shaft therein;
a spacer means in said annular chamber between said sleeve and said housing, said spacer means being made of a material of low heat conductivity;
at least one air inlet opening in said housing in communication with said annular chamber for the passage of air through said annular chamber; and
at least one removably mounted heat-conducting thin resilient strip of material of high heat conductivity resiliently mounted between said sleeve and said housing in said annular chamber in tight contact with said sleeve and said housing to connect said sleeve with said housing in heat-conductive relation, said strip providing an increased surface area exposed to the passage of air through said annular chamber and having a length to take up a substantially chordal position within said housing.

8. The combination of claim 7 wherein two such strips extend along respective chords on apposite sides of the sleeve.

9. The combination of
a housing;
a shaft having a fiber spinning rotor at one end within said housing and a drive whorl at an opposite end;
a sleeve disposed within said housing in spaced relation to said housing to define an annular chamber therewith and in spaced relation to said shaft;
at least a pair of anti-friction bearings mounted in said sleeve and rotatably supporting said shaft therein;
a spacer means in said annular chamber between said sleeve and said housing, said spacer means being made of a material of low heat conductivity;
at least one air inlet opening in said housing in communication with said annular chamber for the passage of air through said annular chamber; and
at least one removably mounted heat-conducting thin resilient spiral metal strip of high heat conductivity resiliently mounted between said sleeve and said housing in said annular chamber, said strip surrounding said sleeve and being in tight contact with said sleeve and said housing to connect said sleeve with said housing in heat-conductive relation, said strip providing an increased surfce area exposed to the passage of air through said annular chamber.

10. The combination of
a housing;

a shaft having a fiber spinning rotor at one end within said housing and a drive whorl at an opposite end;

a sleeve disposed within said housing in spaced relation to said housing to define an annular chamber therewith and in spaced relation to said shaft;

at least a pair of anti-friction bearings mounted in said sleeve and rotatably supporting said shaft therein;

a spacer means in said annular chamber between said sleeve and said housing, said spacer means being made of a material of low heat conductivity;

at least one air inlet opening in said housing in communication with said annular chamber for the passage of air through said annular chamber; and a plurality of removably mounted heat-conducting thin resilient U-shaped metal strips of high heat conductivity distributed circumferentially about said sleeve and being resiliently clamped between said sleeve and said housing in said annular chamber in tight contact with said sleeve and said housing to connect said sleeve with said housing in heat-conductive relation, each said strip providing an increased surface area exposed to the passage of air through said annular chamber.

* * * * *

UNITED STATES PATENT AND TRADEMARK OFFICE
CERTIFICATE OF CORRECTION

PATENT NO. : 4,261,165
DATED : April 14, 1981
INVENTOR(S) : ULRICH BURGERMEISTER, ET AL It is certified that error appears in the above—identified patent and that said Letters Patent is hereby corrected as shown below:

Column 1, line 6, change "abondoned" to --abandoned--

Column 2, line 11 and 12, change "conjuction to --conjunction--

Column 2, line 48, After "3" delete "at" (second occurence)

Column 2, line 68, change "ithin" to --within--

Column 3, line 7, change "2" to --22--

Column 3, line 13, change "atmosperic" to --atmospheric--

Column 3, line 28, change "ilel resilient" to --(i.e. resilient)--

Column 3, line 48, change "contracts" to --contacts--

Column 3, line 56, change "37f" to --27f--

UNITED STATES PATENT AND TRADEMARK OFFICE
CERTIFICATE OF CORRECTION

PATENT NO. : 4,261,165
DATED : April 14, 1981
INVENTOR(S) : ULRICH BURGERMEISTER, ET AL It is certified that error appears in the above—identified patent and that said Letters Patent is hereby corrected as shown below:

Column 6, line 40, change "apposite" to --opposite--

Column 6, line 64, change "surfce" to --surface--

Signed and Sealed this

Twenty-eighth Day of July 1981

[SEAL]

Attest:

GERALD J. MOSSINGHOFF

Attesting Officer — Commissioner of Patents and Trademarks